(12) United States Patent
Hunt et al.

(10) Patent No.: US 10,706,973 B2
(45) Date of Patent: Jul. 7, 2020

(54) VERY SIMPLIFIED BOILING WATER REACTORS FOR COMMERCIAL ELECTRICITY GENERATION

(71) Applicant: GE-Hitachi Nuclear Energy Americas LLC, Wilmington, NC (US)

(72) Inventors: Brian S. Hunt, Wilmington, NC (US); Christer N. Dahlgren, Wilmington, NC (US); Wayne Marquino, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 611 days.

(21) Appl. No.: 15/585,162

(22) Filed: May 2, 2017

(65) Prior Publication Data
US 2018/0322966 A1    Nov. 8, 2018

(51) Int. Cl.
*G21C 9/00* (2006.01)
*G21C 9/004* (2006.01)
(Continued)

(52) U.S. Cl.
CPC ............. *G21C 9/004* (2013.01); *G21C 1/028* (2013.01); *G21C 1/086* (2013.01); *G21C 9/016* (2013.01);
(Continued)

(58) Field of Classification Search
CPC ...... G21C 13/00; G21C 13/02; G21C 13/028; G21C 13/10; G21C 15/00; G21C 15/18; G21C 15/185
See application file for complete search history.

(56) References Cited

U.S. PATENT DOCUMENTS

| | | | |
|---|---|---|---|
| 4,826,652 | A | 5/1989 | Schoening |
| 4,889,682 | A | 12/1989 | Gou et al. |

(Continued)

FOREIGN PATENT DOCUMENTS

| | | |
|---|---|---|
| JP | 6031740 | 4/1994 |
| JP | 2016145726 | 8/2016 |

(Continued)

OTHER PUBLICATIONS

WIPO, International Search Report in Corresponding PCT Application PCT/US2018/028301, dated Oct. 4, 2018.
(Continued)

*Primary Examiner* — Marshall P O'Connor
(74) *Attorney, Agent, or Firm* — Ryan Alley IP

(57) ABSTRACT

Nuclear reactors have very few systems for significantly reduced failure possibilities. Nuclear reactors may be boiling water reactors with natural circulation-enabling heights and smaller, flexible energy outputs in the 0-350 megawatt-electric range. Reactors are fully surrounded by an impermeable, high-pressure containment. No coolant pools, heat sinks, active pumps, or other emergency fluid sources may be present inside containment; emergency cooling, like isolation condenser systems, are outside containment. Isolation valves integral with the reactor pressure vessel provide working and emergency fluid through containment to the reactor. Isolation valves are one-piece, welded, or otherwise integral with reactors and fluid conduits having ASME-compliance to eliminate risk of shear failure. Containment may be completely underground and seismically insulated to minimize footprint and above-ground target area.

16 Claims, 3 Drawing Sheets

(51) Int. Cl.

| | | |
|---|---|---|
| *G21C 1/08* | (2006.01) | |
| *G21C 1/02* | (2006.01) | |
| *G21C 15/18* | (2006.01) | |
| *G21C 13/02* | (2006.01) | |
| *G21C 9/016* | (2006.01) | |
| *G21C 9/033* | (2006.01) | |
| *G21C 17/04* | (2006.01) | |
| *G21C 13/093* | (2006.01) | |
| *G21C 13/087* | (2006.01) | |

(52) U.S. Cl.
CPC ........... *G21C 13/02* (2013.01); *G21C 15/18* (2013.01); *G21C 9/033* (2013.01); *G21C 13/087* (2013.01); *G21C 13/093* (2013.01); *G21C 17/042* (2013.01)

(56) References Cited

U.S. PATENT DOCUMENTS

| | | |
|---|---|---|
| 4,948,554 A | 8/1990 | Gou et al. |
| 5,059,385 A | 10/1991 | Gluntz et al. |
| 5,126,099 A | 6/1992 | van Kuijk |
| 5,761,262 A | 6/1998 | No et al. |
| 9,583,224 B2 * | 2/2017 | Moon ............... G21C 15/18 |
| 10,115,488 B2 | 10/2018 | Han et al. |
| 2016/0196885 A1 | 7/2016 | Singh et al. |

FOREIGN PATENT DOCUMENTS

| | | |
|---|---|---|
| KR | 101241142 | 3/2013 |
| KR | 1020140009835 | 1/2014 |
| KR | 1020150041220 | 4/2015 |

OTHER PUBLICATIONS

WIPO, Written Opinion in Corresponding PCT Application PCT/US2018/028301, dated Oct. 4, 2018.
GE-Hitachi Nuclear Energy, "The ESBWR Plant General Description" Jun. 1, 2011.
CCI, "CCI Nuclear Valve Resource Guide for Power Uprate and Productivity Gains" 2003.
Nuscale Power, "NuScale Module Small-Break Loss-of-Coolant Accident Phenomena Identification and Ranking Table" Jan. 2013.

\* cited by examiner

VERY SIMPLIFIED BOILING WATER REACTORS FOR COMMERCIAL ELECTRICITY GENERATION

BACKGROUND

FIG. 1 is a schematic of a containment building 36 that houses a reactor pressure vessel 42 with various configurations of fuel 41 and reactor internals for producing nuclear power in a related art economic simplified boiling water reactor (ESBWR). Reactor 42 is conventionally capable of producing and approved to produce several thousand megawatts of thermal energy through nuclear fission. Reactor 42 sits in a drywell 51, including upper drywell 54 and a lower drywell 3 that provides space surrounding and under reactor 42 for external components and personnel. Reactor 42 is typically several dozen meters high, and containment building 36 even higher above ground elevation, to facilitate natural circulation cooling and construction from ground level. A sacrificial melt layer 1, called a basemat-internal melt arrest and coolability device, is positioned directly below reactor 1 to cool potential falling debris, melted reactor structures, and/or coolant and prevent their progression into a ground below containment 36.

Several different pools and flowpaths constitute an emergency core coolant system inside containment 36 to provide fluid coolant to reactor 26 in the case of a transient involving loss of cooling capacity in the plant. For example, containment 36 may include a pressure suppression chamber 58 surrounding reactor 42 in an annular or other fashion and holding suppression pool 59. Suppression pool 59 may include an emergency steam vent used to divert steam from a main steam line into suppression pool 59 for condensation and heat sinking, to prevent over-heating and over-pressurization of containment 36. Suppression pool 59 may also include flow paths that allow fluid flowing into drywell 54 to drain, or be pumped, into suppression pool 59. Suppression pool 59 may further include other heat-exchangers or drains configured to remove heat or pressure from containment 36 following a loss of coolant accident. An emergency core cooling system line and pump 10 may inject coolant from suppression pool 59 into reactor 42 in order to make up lost feedwater and/or other emergency coolant supply.

As shown in FIG. 1, a gravity-driven cooling system (GDCS) pool 37 can further provide coolant to reactor 42 via piping 57. A passive containment cooling system (PCCS) pool 65 may condense any steam inside containment 36, such as steam created through reactor depressurization to lower containment pressure or a main steam line break, and feed the condensed fluid back into GDCS pool 37. An isolation cooling system (ICS) pool 66 may take steam directly at pressure from reactor 42 and condense the same for recirculation back into reactor 42. These safety systems may be used in any combination in various reactor designs, each to the effect of preventing overheating and damage of core 41, reactor 42 and all other structures within containment 36 by supplying necessary coolant, removing heat, and/or reducing pressure. Several additional systems are typically present inside containment 36, and several other auxiliary systems are used in related art ESBWR. Such ESBWRs are described in "The ESBWR Plant General Description" by GE Hitachi Nuclear Energy, Jun. 1, 2011, incorporated herein by reference in its entirety, hereinafter referred to as "ESBWR."

SUMMARY

Example embodiments include nuclear reactors having virtually no failure mode outside of their containment. Example embodiment nuclear reactors may be similar to ESBWR designs with larger height-to-width ratios that enable natural circulation within the pressure vessel, but smaller, especially in the width direction, to produce less than 1000 megawatts thermal energy. Example embodiment containments may fully surround the nuclear reactor and prevent fluid leakage out of the containment even at elevated pressures. Example embodiment containments may be extremely simplified with no coolant sources like GDCS pools, suppression pools, or moving coolant pumps. One of more coolant sources outside containment, like isolation condenser systems, are sufficient to provide long-term, reliable cooling to the nuclear reactor. Example embodiment isolation valves can be used at each fluid connection to the reactor to make the reactor integrally isolatable, including for the primary coolant loop and the emergency coolant source. Example-embodiment isolation valves are redundant and integral with the nuclear reactor and fluid conduit and fabricated up to ASME nuclear standards for reactor vessels so as to eliminate risk of shear failure. Where example embodiment containment is penetrated, penetration seals may surround and make impermeable containment at the penetrations to high gauge pressures. Example embodiment containments and reactors may be completely underground and, along with an emergency coolant source, surrounded by a seismic silo that shields the same from earthquake and other shocks. Limited access pointed, such as a single top shield covering the silo and containment, may provide simplified access for maintenance, flooding, and/or refueling.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
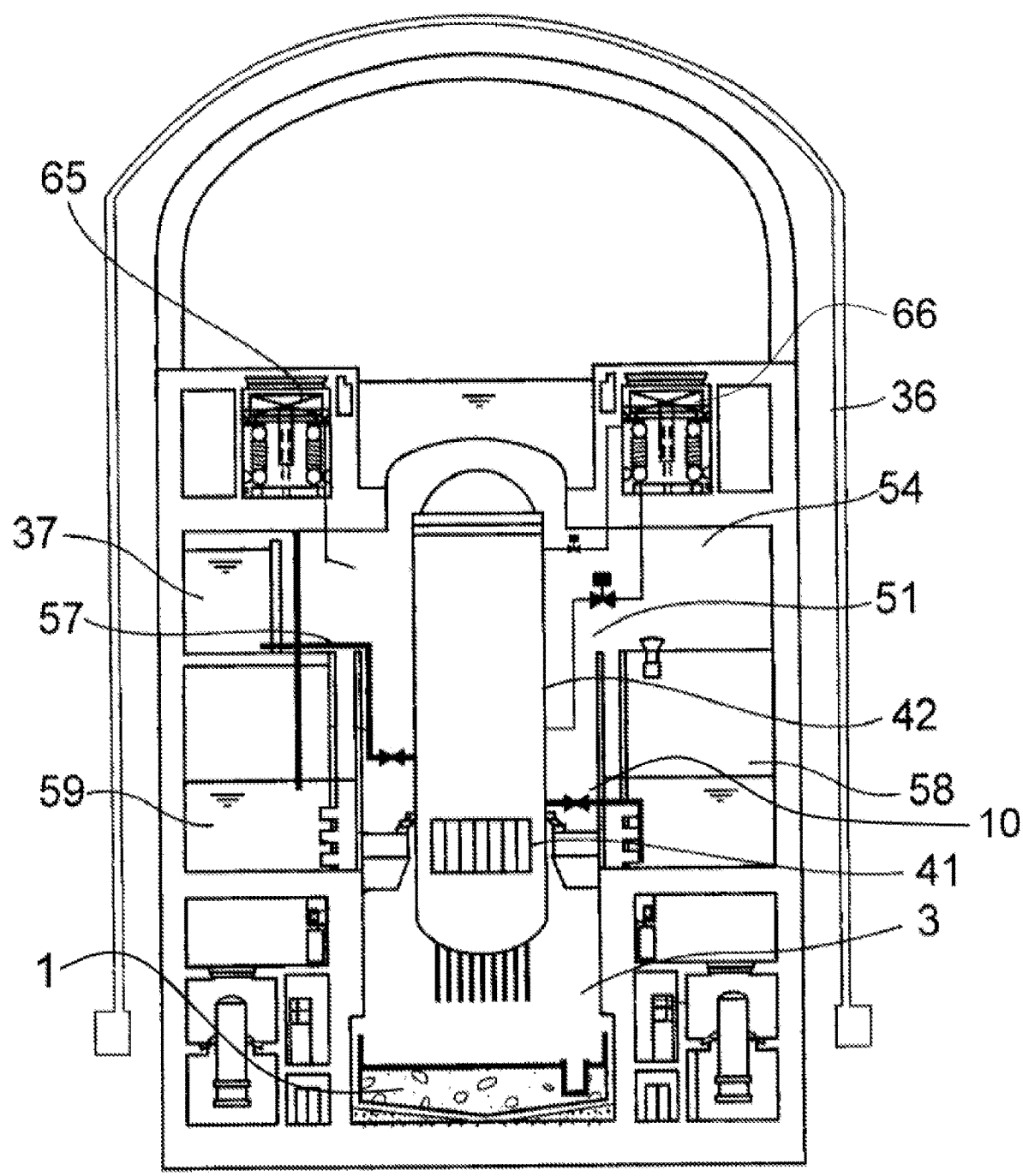
FIG. 1 is a schematic of a related art nuclear power containment and internals.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that ESBWRs have large 1000+ megawatt-electric power ratings with associated large reactor volumes and construction costs. The inventors have further recognized that the large sizes of ESBWRs generally require large containments that can feasibly be constructed only above ground. ESBWRs also use numerous passive safety systems with piping conduits and other flowpaths to the reactor capable of breaking or leaking, causing a loss of coolant accident. The inventors have further recognized that ESBWRs are useable primarily for long-term, baseline power generation, without modularity or flexibility of construction and operation in areas needing immediate or peaking power generation capacity. To overcome these newly-recognized problems as well as others, the inventors have developed example embodiments and methods described below to address these and other problems recognized by the inventors with unique solutions enabled by example embodiments.

The present invention is nuclear reactors, plants containing the same, and methods of operating such reactors and plants. In contrast to the present invention, the few example embodiments and example methods discussed below illustrate just a subset of the variety of different configurations that can be used as and/or in connection with the present invention.

Figure 2:
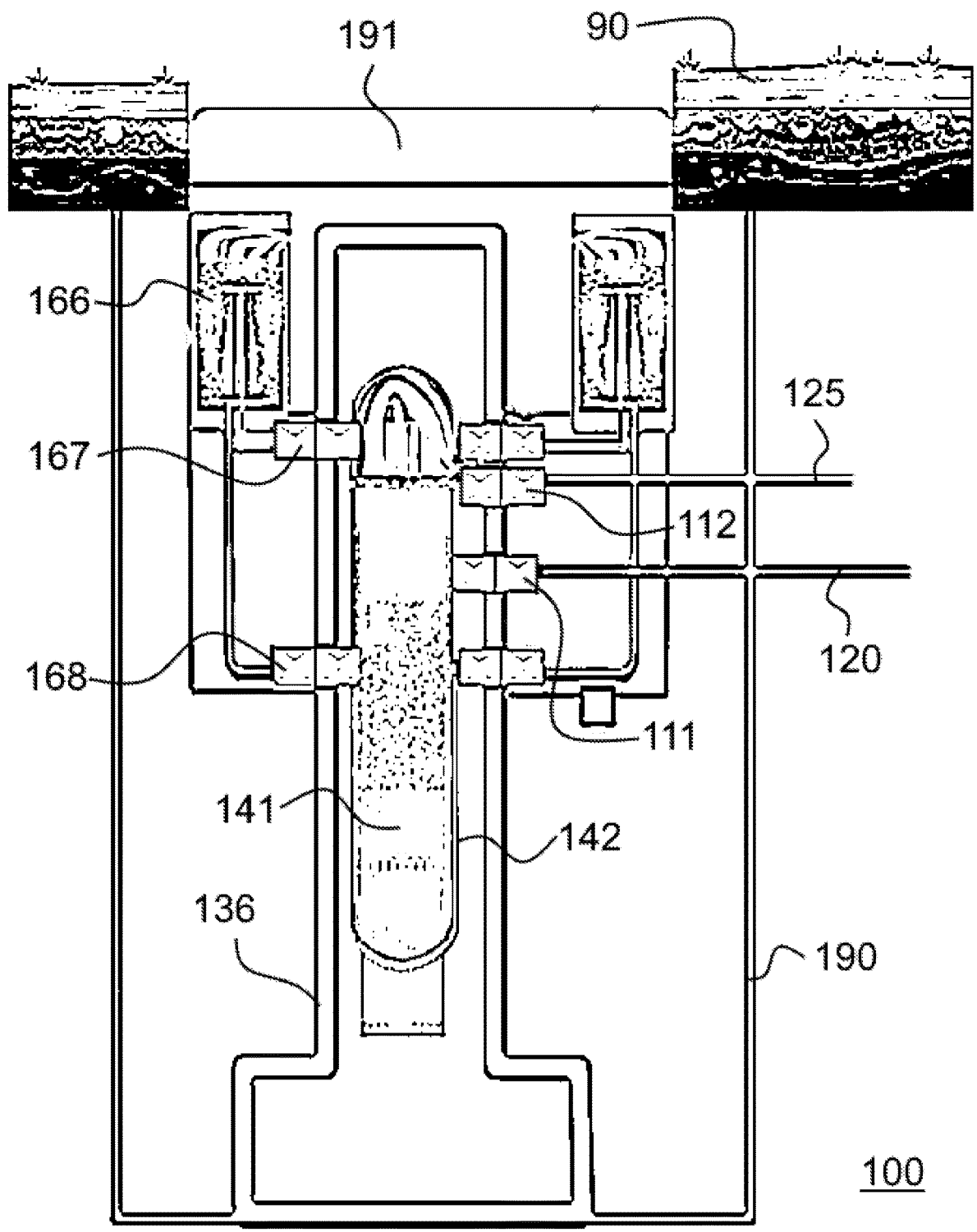
FIG. 2 is a schematic of an example embodiment very simplified boiling water nuclear reactor system.

FIG. 2 is a schematic of an example embodiment reactor system 100 including example embodiment reactor 142, example embodiment containment 136, and related cooling and power generation systems. Although not shown in FIG. 2, example embodiment system 100 is useable with conventional and known power generating equipment such as high- and low-pressure turbines, electrical generators, switchyards, condensers, cooling towers or heat sinks, etc., which may connect, for example to main feedwater line 120 and main steam line 125 in a similar fashion to any power generation facility. Example embodiment containment 136 is composed of resilient, impermeable material for limiting migration of radioactive material and plant components in the case of a transient or accident scenario. For example, containment 136 may be an integrally-formed concrete structure, potentially with reinforcing internal steel or rebar skeleton, several inches or feet thick. Or, for example, as discussed below, because containment 136 may be relatively smaller, an all-steel body may be use without being prohibitively expensive or complexly-fabricated, to enhance strength, radiation shielding, and lifespan of containment 136.

As shown in FIG. 2, example embodiment containment 136 may be underground, potentially housed in a reactor silo 190. A concrete lid 191 or other surface shield level with, or below, ground 90 may enclose silo 190 housing example embodiment reactor 142 and containment 136. Silo 190 and lid 191 may be seismically isolated or hardened so as to minimize any shock wave encountered from the ground and thus minimize impact of seismic events on reactor 142. If underground as shown in FIG. 2, example embodiment system 100 may present an exceedingly small strike target and/or be hardened against surface impacts and explosions. Further, if underground, example embodiment system 100 may have additional containment against radioactive release and enable easier flooding in the case of emergency cooling. Although not shown, any electricity-generating equipment may be connected above ground without loss of these benefits, and/or such equipment may also be place below ground.

Based on the smaller size of example embodiment reactor 142 discussed below, example embodiment containment 136 may be compact and simplified relative to existing nuclear power plants, including the ESBWR. Conventional operating and emergency equipment, including a GDCS, PCCS, suppression pools, Bimacs, backup batteries, wetwells, torii, etc. may be wholly omitted from containment 136. Containment 136 may be accessible through fewer access points as well, such as a single top access point under shield 191 that permits access to reactor 142 for refueling and maintenance. The relatively small volume of example embodiment reactor 142 and core 141 may not require a bimac for floor arrest and cooling, because no realistic scenario exists for fuel relocation into containment 136; nonetheless, example embodiment containment 136 may have sufficient floor thickness and spread area to accommodate and cool any relocated core in its entirety, as shown in FIG. 2. Moreover, total penetrations through containment 136 may be minimized and or isolated, as discussed further in connection with FIG. 3, below, to reduce or effectively eliminate risk of leakage from containment 136.

Example embodiment reactor 142 may be a boiling-water type reactor, similar to approved ESBWR designs in reactor internals and height. Reactor 142 may be smaller than, such as one-fifth the volume of, ESBWRs, producing only up to 600 megawatts of electricity for example, with a proportionally smaller core 141, for example operating at less than 1000 megawatt-electric. For example, example embodiment reactor 142 may be almost 28 meters in height and slightly over 3 meters in diameter, with internals matching ESBWR internals but scaled down proportionally in the transverse direction to operate at approximately 900 megawatt-thermal and 300 megawatt-electric ratings. Or, for example, reactor 142 may be a same proportion as an ESBWR, with an approximate 3.9 height-to-width ratio, scaled down to a smaller volume. Of course, other dimensions are useable with example embodiment reactor 142, with smaller height-to-width ratios such as 2.7, or 2.0, that may enable natural circulation at smaller sizes or proper flow path configuration inside the reactor.

Keeping a relatively larger height of example embodiment reactor 142 may preserve natural circulation effects achieved by known ESBWRs in example embodiment reactor 142. Similarly, smaller reactor 142 may more easily be positioned underground with associated cooling equipment and/or possess less overheating and damage risk due to smaller fuel inventory in core 141. Even further, smaller example embodiment reactor 142 with lower power rating may more readily satisfy modular power or peaking power demands, with easier startup, shutdown, and/or reduced power operations to better match energy demand.

A coolant loop, such as main feedwater line 120 and main steam line 125, may flow into reactor 142 in order to provide moderator, coolant, and/or heat transfer fluid for electricity generation. An emergency coolant source, such as one or more isolation condenser systems 166, may further provide emergency cooling to reactor 142 in the instance of loss of feedwater from line 120. Each isolation condenser system 166 may further have two connections to example embodiment reactor 142, one for steam outlet and one for condensate return to reactor 142. Each of these connections to reactor 142 may use isolation valves 111, 112, 167, and/or 168 that are integrally connected to reactor 142 inside containment 136 and represent negligible failure risk. When using isolation valves 111, 112, 167, and/18 168 with a small number of systems flowing into example embodiment reactor 142, the possibility of a loss of coolant accident is negligible, at least several orders of magnitude less than the risk in conventional light water plants.

Figure 3:
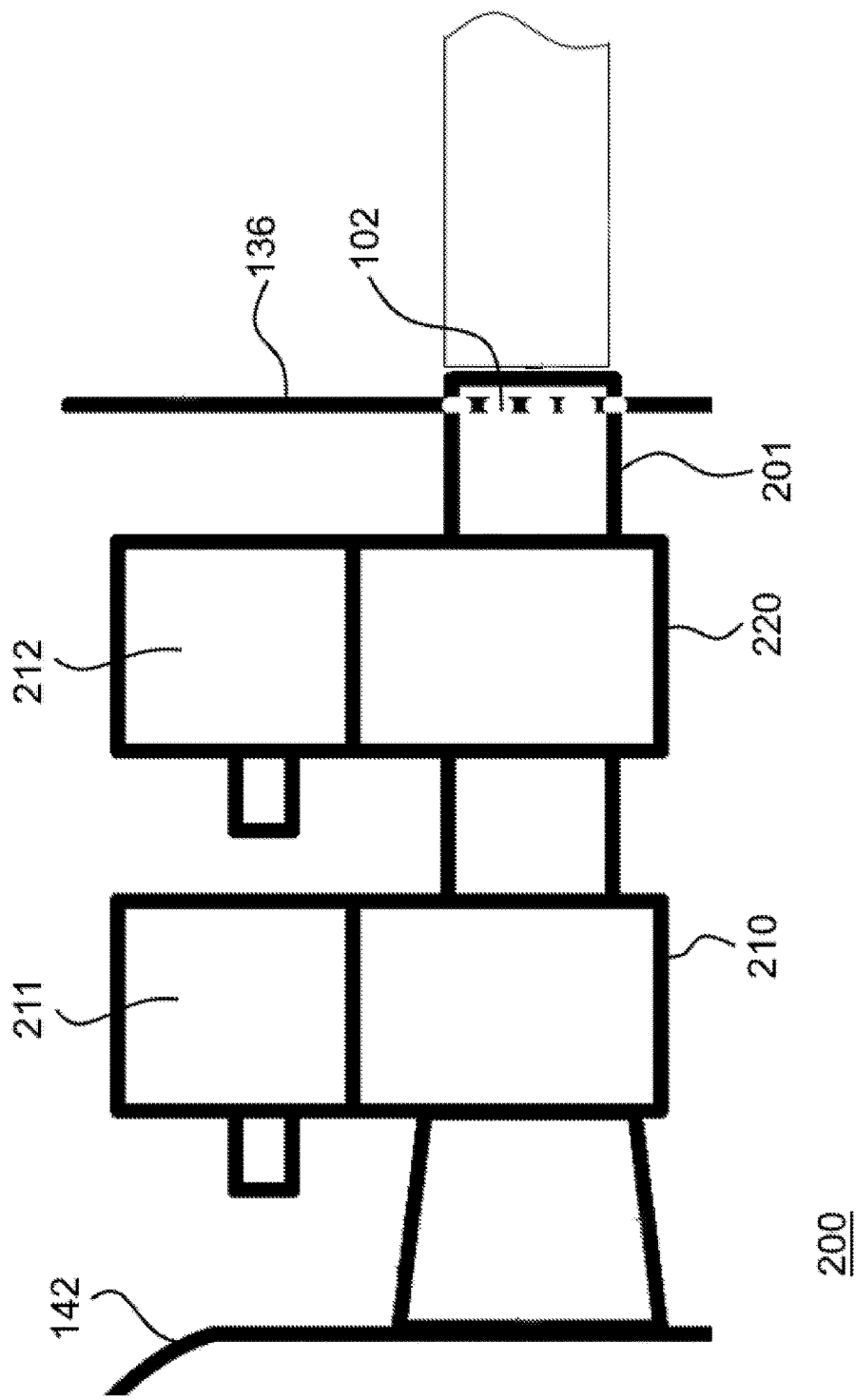
FIG. 3 is a schematic of an example embodiment valve useable with example embodiment systems.

FIG. 3 is a schematic of an example embodiment isolation valve 200, which may be used for any of valves 111, 112, 167, and/or 168, or any other valve for fluid delivery to/removal from example embodiment reactor 142 through example embodiment containment 136. Although valves 111, 112, 167, and 168 are shown straddling containment 136 in FIG. 2, it is understood that they may also be completely inside containment 136 as shown in FIG. 3. Example embodiment valve body 201, including two isolation gate valves 210 and 220 and connections between the two, has high-reliability operation without any comparable risk of leakage or failure. For example, valve 200 is not susceptible to guillotine-type shear breaks found in conventional steam and feedwater lines inside containment of ESBWRs. If used with a smaller-size example embodiment reactor 142, valve 200 may be smaller and/or simplified and control relatively less feedwater or steam flows than conventional conduits and valves, further reducing fabrication challenges and risk of failure in example embodiment system 100 (FIG. 2).

As shown in FIG. 3, valve 200 includes a primary isolation gate valve 210 and a secondary isolation gate valve 220 for redundant sealing and/or blowout prevention. Primary and secondary gate valves 210 and 220 are integrally formed with valve body 201 that connects to reactor 142 and a flow conduit, permitting flow therebetween with no risk of breakage or disconnect. Higher-reliability actuators 211 and 212 may each be respectively connected to primary and secondary gate valves 210 and 220 and allow minimal leakage from gate valves 210 and 220. Primary isolation gate valve 210 and actuator 211 may be a CCI high-energy isolation gate valve and actuator disclosed in "CCI Nuclear Valve Resource Guide for Power Uprate and Productivity Gains," 2003, CCI, incorporated herein by reference in its entirety, for example. Secondary isolation gate valve 220 and actuator 212 may be another CCI high-energy isolation gate valve and actuator. Similarly, valves 210 and 220 may be check valves, globe valves, etc. having high reliability and no significant shear breakage failure mode when formed together in valve body 201.

Valve body 201 may be made of a single piece of forged material, such as a metal useable in an operating nuclear reactor environment, including all of primary isolation gate valve 210 and secondary isolation gate valve 220 as a single piece. Alternatively, ASME-standard welding, such as between primary and secondary valves 210 and 220, may be used at reactor vessel-level of reliability. Valve body 201 is further integrally welded to reactor 142 using ASME-standard welding with negligible failure possibility. In this way, all flow paths or conduits may be integral with reactor 142 inside containment 136, where "integral" is defined throughout this disclosure as "with material continuity and inseparability, including single-piece forged and welded materials at ASME nuclear specifications." Because example embodiment valve 200 as integrally joined to reactor 142 and cannot realistically break, possibility of an un-isolatable loss of coolant accident from reactor 142 is effectively eliminated. In this way, reactor 142 is integrally isolatable from any external conduit (such as feedwater line 120 or main steam line 125 in FIG. 2) to which valve body may join in any manner.

Where valve body 201 passes through containment 136, a penetration seal 102 may be used to isolate and impermeably seal about valve body 201. Penetration seal 102 may maintain a large pressure gradient across containment 136 without passage of material about valve 200. With the smaller failure risk of example embodiment valve 200 and added isolation of penetration seals 102, there may be relatively low risk of a loss of coolant or leakage into or from containment 136, because any breakage must occur in a conduit outside containment. That is, containment seal 102 at an end valve body 201 effectively eliminates the risk of any pipe break injecting coolant into containment 140 from the balance of plant piping inventory. Alternatively, penetration seal 102 may be positioned on a conduit joining to valve body 201, at a very short distance inside containment 136.

As seen in FIG. 2, all of valves 111, 112, 167, 168 and any other fluid connections to reactor 142 may use example embodiment valve 200 of FIG. 3 to eliminate any non-negligible risk of flow path failure inside containment 136. Valves 112, 111, 168, and/or 167 may be passively actuated into fail-safe configurations. For example, main feedwater valve 111 and/or main steam valve 112 may be sealed closed in the event of an accident or abnormal operating condition. Battery-operated, explosive, and/or fail-closed solenoid actuators of the valves, for example, may be initiated upon detecting abnormal operating conditions. At the same time, isolation condenser valves 167 and 168 may be opened with similar reliability, allowing passive heat removal from reactor 142 through isolation condenser system 166.

Isolation condensers 166 may be known designs that transfer reactor heat to ambient environment and condense reactor coolant without leakage. Similarly, isolation condensers 166 may be condensers 300 from co-owned application Ser. No. 15/635,400 to Hunt, Dahlgren, and Marquino, filed Jun. 28, 2017 for ISOLATION CONDENSER SYSTEMS FOR NUCLEAR REACTOR COMMERCIAL ELECTRICITY GENERATION and incorporated by reference herein in its entirety. The relatively lower power of example embodiment reactor 142 may permit safe cooling through simple, passive operation of isolation condenser 166 for several days without operator intervention without risk of overheating, loss of coolant, or other damage to reactor 142.

Aside from valves 111, 112, 167, and 168, example embodiment containment 136 may be sealed about any other valve or penetration, such as power systems, instrumentation, coolant cleanup lines, etc. The fewer penetrations, smaller size, lack of systems inside, and/or underground placement of containment 136 may permit a higher operating pressure, potentially up to near reactor pressures of several hundred, such as 300, psig without any leakage potential.

As seen in example embodiment reactor system 100, several different features permit significantly decreased loss of coolant probability, enable responsive and flexible power generation, reduce plant footprint and above-ground strike target, and/or simplify nuclear plant construction and operation. Especially by using known and approved ESBWR design elements with smaller volumes and core sizes, example embodiment reactor 142 may still benefit from passive safety features such as natural circulation inherent in the ESBWR design, while allowing a significantly smaller and simplified example embodiment containment 136 and reliance on passive isolation condensers 166 for emergency heat removal.

Example embodiments and methods thus being described, it will be appreciated by one skilled in the art that example embodiments may be varied and substituted through routine experimentation while still falling within the scope of the following claims. For example, a variety of different coolants and fuel types are compatible with example embodiments and methods simply through proper operating and fueling of example embodiments—and fall within the scope of the claims. Such variations are not to be regarded as departure from the scope of these claims.

What is claimed is:

1. A simplified nuclear reactor facility for commercially generating electricity, the facility comprising:
   a nuclear reactor;
   a containment completely and impermeably surrounding the nuclear reactor, wherein there is no open coolant source or active coolant pump inside the containment;
   at least one primary coolant loop connecting to two of a plurality of isolation valves of the nuclear reactor through the containment; and
   at least one emergency coolant source outside the containment and connecting to two of the plurality of isolation valves of the nuclear reactor through the containment, wherein each of the plurality of isolation valves is integral with the nuclear reactor.

2. The facility of claim 1, wherein the emergency coolant source is an isolation condenser system with a pool configured to condense a coolant of the nuclear reactor and transfer heat from the nuclear reactor to ambient environment.

3. The facility of claim 2, wherein the isolation valve connected to the isolation condenser system are configured to fail open or open at detection of a transient event, and wherein the isolation valves connected to the primary coolant loop are configured to fail closed or close at detection of the transient event.

4. The facility of claim 1, further comprising:
   a plurality of penetration seals, wherein each one of the penetration seals lines and seals the containment at each one of the isolation valves.

5. The facility of claim 1, wherein all penetrations that move a fluid coolant to or from the reactor include at least one of the isolation valves, and wherein the containment is fluid-tight up to 300 psig.

6. The facility of claim 1, wherein the nuclear reactor is a maximum 1000 megawatt-thermal rated boiling water reactor having a height that exceeds its width by a factor of at least 3.9.

7. The facility of claim 1, wherein the containment is entirely underground.

8. The facility of claim 1, further comprising:
   a silo surrounding the containment and the emergency coolant source, wherein the silo is a seismic structure configured to reduce seismic shocks to the containment, the emergency coolant source, and the nuclear reactor.

9. A nuclear reactor power plant for commercially generating electricity, the plant comprising:
   a maximum 1000 megawatt-thermal rated boiling water nuclear reactor having a height that exceeds its width by a factor of at least 3.9;
   a containment completely and impermeably surrounding the nuclear reactor, wherein there is no open coolant source or active pump inside the containment, and wherein the containment is completely underground;
   at least one primary coolant loop connecting to the nuclear reactor through the containment;
   at least one emergency coolant source outside the containment and connecting to the nuclear reactor through the containment, wherein the primary coolant loop and the emergency coolant source are integral with the nuclear reactor inside containment;
   a plurality of isolation valves connecting the primary coolant loop and the emergency coolant source to the nuclear reactor through the containment, wherein each of the isolation valves includes a primary and a secondary actuator, and wherein each of the isolation valves is integral with the nuclear reactor;
   a plurality of penetration seals, wherein each one of the penetration seals lines and seals the containment at each one of the isolation valves; and
   a silo surrounding the containment and the emergency coolant source, wherein the silo is a seismic structure configured to reduce seismic shocks to the containment, the emergency coolant source, and the nuclear reactor.

10. A simplified nuclear reactor facility for commercially generating electricity, the facility comprising:
    a nuclear reactor;
    a containment completely and impermeably surrounding the nuclear reactor, wherein there is no open coolant source or active coolant pump inside the containment;
    at least one primary coolant loop connecting to two of a plurality of isolation valves of the nuclear reactor through the containment; and
    an isolation condenser system outside the containment with a pool configured to condense a coolant of the nuclear reactor and transfer heat from the nuclear reactor to ambient environment connecting to two of the plurality of isolation valves of the nuclear reactor through the containment, wherein each of the plurality of isolation valves, includes a primary and a secondary actuator, is integral with the nuclear reactor, and is configured to be passively opened and passively sealed.

11. The facility of claim 10, wherein the plurality of isolation valves connected to the isolation condenser system are configurewd to fail open or open at detection of a transient event, and wherein the isolation valves connected to the primary coolant loop are configured to fail closed or close at detection of the transient event.

12. The facility of claim 10, further comprising:

a plurality of penetration seals, wherein each one of the penetration seals lines and seals the containment at each one of the isolation valves.

13. The facility of claim 10, wherein all penetrations that move a fluid coolant to or from the reactor include at least one of the isolaton valves, and wherein the containment is fluid-tight up to 300 psig.

14. The facility of claim 10, wherein the nuclear reactor is a maximum 1000 megawatt-thermal rated boiling water reactor having a height that exceeds its width by a factor of at least 3.9.

15. The facility of claim 10, wherein the containment is entirely underground.

16. the facility of claim 10, further comprising:

a silo surrounding the containment and the emergency coolant source, wherein the silo is a seismic structure configured to reduce seismic shocks to the containment, the emergency coolant source, and the nuclear reactor.

* * * * *